United States Patent [19]
Colford

[11] Patent Number: 5,074,535
[45] Date of Patent: Dec. 24, 1991

[54] ELASTOMERIC MOUNTING

[75] Inventor: Terence H. Colford, Leicester, England

[73] Assignee: Dunlop Limited a British Company, United Kingdom

[21] Appl. No.: 289,533

[22] Filed: Dec. 27, 1988

Related U.S. Application Data

[63] Continuation of Ser. No. 214,832, Jul. 1, 1988, abandoned, which is a continuation of Ser. No. 80,543, Jul. 31, 1987, abandoned.

[30] Foreign Application Priority Data

Aug. 6, 1986 [GB] United Kingdom ............... 8619240

[51] Int. Cl.⁵ .............................................. B60G 11/00
[52] U.S. Cl. .................................. 267/293; 267/140.5; 267/140.3
[58] Field of Search ............ 267/293, 292, 294, 140.5, 267/153, 140.3, 141, 141.2, 141.3, 140.1, 281, 219, 257, 136, 140, 141.7, 122, 75, 13; 248/562, 608, 609, 636; 188/322.5

[56] References Cited

U.S. PATENT DOCUMENTS

| | | | |
|---|---|---|---|
| 2,415,280 | 2/1947 | Fink | 267/140.3 |
| 2,425,565 | 8/1947 | Robinson | 267/140.1 |
| 2,520,442 | 8/1950 | Schwartz | 267/140.4 |
| 2,668,033 | 2/1954 | Lee | 267/140.3 |
| 2,783,959 | 3/1957 | Boschi et al. | 267/140.3 |
| 2,942,872 | 6/1960 | Muller | 267/141.3 |
| 4,032,125 | 6/1977 | Minakawa et al. | 267/294 |
| 4,632,372 | 12/1986 | Nakajima et al. | 267/140.1 |
| 4,842,258 | 6/1989 | Msiaka et al. | 267/140.3 |

FOREIGN PATENT DOCUMENTS

| | | | |
|---|---|---|---|
| 0603301 | 8/1960 | Canada | 267/140.4 |
| 0069787 | 1/1983 | European Pat. Off. | 267/140.1 |
| 2616258 | 11/1977 | Fed. Rep. of Germany | |
| 0164031 | 8/1985 | Japan | 267/140.1 |
| 129809 | 10/1950 | Sweden | |
| 546454 | 7/1942 | United Kingdom | |
| 549598 | 11/1942 | United Kingdom | |
| 555806 | 11/1942 | United Kingdom | |
| 116999 | 6/1943 | United Kingdom | 267/141 |
| 576173 | 3/1946 | United Kingdom | |
| 586608 | 3/1947 | United Kingdom | |
| 621693 | 4/1949 | United Kingdom | |
| 690443 | 9/1951 | United Kingdom | |
| 853268 | 11/1960 | United Kingdom | |
| 1463549 | 2/1977 | United Kingdom | |
| 2033534 | 5/1980 | United Kingdom | |
| 2060816 | 10/1980 | United Kingdom | |

Primary Examiner—Robert J. Oberleitner
Assistant Examiner—Mark T. Le
Attorney, Agent, or Firm—Stevens, Davis, Miller & Mosher

[57] ABSTRACT

An elastomeric mounting comprises an annular elastomeric diaphragm shaped to deform by both bending and shear over a normal working range to accommodate relative longitudinal movement between two members between which the diaphragm is located. The diaphragm is provided in combination with elastomeric axial buffer operable to restrain relative movement of the interconnected members outside the normal working range and elastomeric transverse load bearing to restrain relative transverse movements.

9 Claims, 2 Drawing Sheets

ELASTOMERIC MOUNTING

This application is a continuation, of application Ser. No. 214,832, filed July 1, 1988 which is a continuation, of application Ser. No. 080,543, filed July 31, 1987 both abandoned.

This invention relates to an elastomeric mounting and in particular, though not exclusively, to an elastomeric mounting suitable for use in providing a low frequency suspension for a vehicle cab.

A vehicle cab suspension, especially a road vehicle cab suspension, usually is required, for operator comfort, to exhibit low frequency and low stiffness characteristics over a wide range of dynamic deflections under normal cab loading conditions. Elastomeric material commonly is used in seeking to meet this requirement and it is known to provide a vehicle cab suspension comprising a pair of tubular metal members arranged co-axially one within the other and interconnected by an annular element of elastomeric material bonded to the tubular members. The annular elastomeric element is orientated such that the normal load of the cab acts in a direction parallel with the longitudinal axis of the tubular member and in consequence vertical movement of the cab relative to the vehicle body is accommodated by shear deflection of the elastomeric material. Whilst the resulting suspension can provide a satisfactory performance it suffers the disadvantage of needing to be of large dimensions in order to allow for the magnitude of shear deflection necessary to accommodate the desired large range of dynamic deflection under normal cab loading conditions.

The present invention seeks to provide for use in a vehicle cab suspension a mounting of more compact construction than hitherto known.

In accordance with the present invention an elastomeric mounting comprises a pair of rigid members arranged to define an annular space therebetween, an annular element of elastomeric material which extends between and serves to interconnect said rigid members, the annular element being bonded to each of said rigid members at surface positions of the respective members which are longtitudinally off-set when the mounting is in an unstressed condition and the annular element of elastomeric material being of a shape which deforms by both shear and bending movements in the event of relative longitudinal movement of the rigid members over a first working range of relative longitudinal positions of the rigid members, elastomeric axial buffer means operable at relative longitudinal positions of the rigid members greater or lesser than those relative positions lying within said first working range to provide outside of said first working range a greater resistance to relative longitudinal movement than that provided by the annular element of elastomeric material within said first working range of relative positions, and elastomeric transverse load bearing means arranged to resist relative movement of the rigid members in transverse directions perpendicular to the direction of said relative longitudinal movement.

The annular element of the elastomeric material preferably is shaped and arranged such that when load is applied is said longitudinal direction the annular elastomeric element deforms from an initially unstressed condition by buckling and shear movement to exhibit a regressive stiffness characteristic.

The annular element of elastomeric material preferably comprises between its inner and outer peripheries an annular section the thickness of which, as considered in the longitudinal direction, is less than the thickness of the element, in said direction, at at least one of the inner and outer peripheral regions.

Preferably, as considered in a longitudinal cross-sectional plane, the minimum thickness of the annular element in said longitudinal direction is less than one half and more preferably less than or equal to one third of the thickness of the element as considered in a direction transverse of the longitudinal direction.

It is further preferred that the surfaces of the rigid members to which the annular element of elastomeric material is bonded are offset in the longitudinal direction when the mounting is in an unstressed condition.

Particularly suitable shapes for the annular element of elastomeric material for providing a regressive stiffness characteristic include shapes in which one of the longitudinally facing surfaces is of a substantially C shape in cross-section.

The elastomeric axial buffer means preferably comprises a pair of buffer elements one of which is arranged to restrict relative longitudinal movement over a second working range due to excess applied load, i.e. to act as an overload buffer, and the other of which is arranged to restrict relative longitudinal movement over a third working range due to excess rebound forces, i.e. to act as a rebound buffer.

Said elastomeric axial buffer means may be comprised at least in part by elastomeric material of or integral with said annular element of elastomeric material.

The elastomeric transverse load bearing element preferably is arranged between the rigid members and preferably is secured to one only of the rigid members. It may be secured by bonding or, for example, by a friction fit. Preferably the transverse load bearing means comprises an annular body of elastomeric material secured to a first one of said rigid members; said annular body may incorporate an annular reinforcement layer and said reinforcement layer may serve to secure the bearing means to said first one of said rigid members as a friction fit.

Preferably the elastomeric transverse load bearing means comprises a peripherally spaced series of projections extending from said annular body to a second of said rigid members. It is further preferred that in the absence of externally applied load the projections are free from contact with said second of said rigid members.

The above and other features of the invention will now be described, by way of example, with reference to the accompanying drawings in which.

An elastomeric mounting 10 for a vehicle cab suspension comprises an inner cylindrical metal tube 11 and an outer metal tube 12 which surrounds and is spaced from the inner tube over part of the length of the inner tube.

Figure 1:
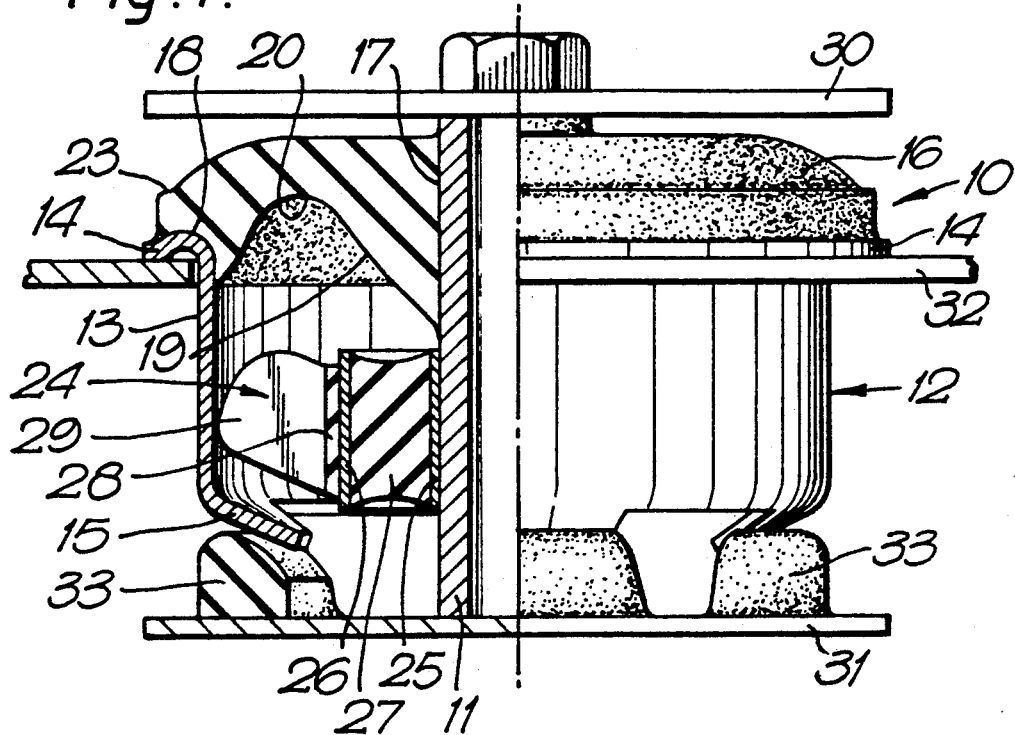
FIG. 1 is a longitudinal sectional view of an elastomeric mounting of the present invention shown in situ with part of a vehicle cab and body structure.

The outer tube 12 is of a spun metal or pressed metal construction and is formed with a central cylindrically shaped portion 13 from an upper end of which, as viewed in FIG. 1, extends a radially outwardly directed flange 14. A frusto-conical shaped abutment flange 15 extends radially inwardly and downwardly from a lower end of the central portion 13.

The tubes 11, 12 are interconnected by an annular rubber diaphragm 16 typically formed of non-reinforced natural rubber. A radially inner surface 17 of the diaphragm is bonded to the inner tube 11 and a radially outer region 18 is bonded to the flange 14 and neighbouring upper end of the cylindrical portion 13 of the outer tube 12.

The thickness of the diaphragm in the longitudinal (vertical) direction of FIG. 1 at the point of minimum thickness of the diaphragm in said direction is substantially equal to one third of the radial thickness of the diaphragm as considered between the confronting surfaces of the tubes 11, 12.

Figure 2:
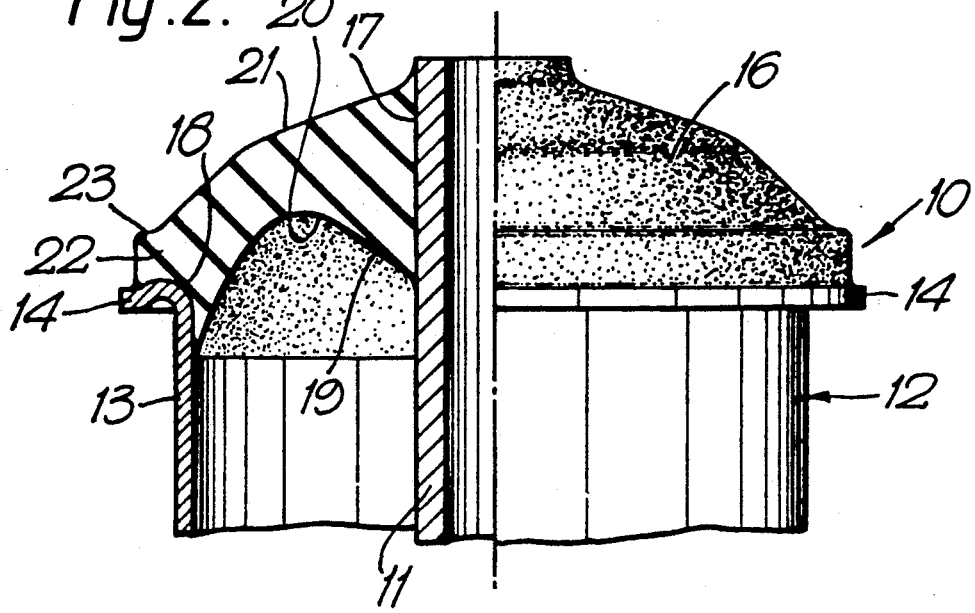
FIG. 2 is a longitudinal sectional view of part of the elastomeric mounting of FIG. 1 when in an unstressed condition.

The diaphragm 16 is of a shape which results in it experiencing both buckling and shear deformation when subject to an applied load which causes the inner tube to move downwardly relative to the outer tube, i.e. from the relative orientation of FIG. 2 to that of FIG. 1. Associated with the buckling and shear deformation is a regressive load-deflection (i.e. stiffness) characteristic. That is, under increasing applied load from a condition of zero applied load the stiffness decreases, though it later increases as the diaphragm (and its integral buffer 23 described below) make contact (over range W2) with a top overload plate 30 as indicated by the change of gradient of the curve of FIG. 3.

To assist in achieving a suitable buckling and shear deformation characteristic the diaphragm 16 is generally C shaped in half cross-section as viewed in FIGS. 1 and 2. The downwardly facing surface 19 of the diaphragm is of a concave shape in cross-section and a central portion 20 of the surface 19 lies vertically above the outwardly extending flange 14 at least in the unstressed condition shown in FIG. 2. It is preferred also, as shown in FIG. 2, that the bonded radially inner surface 17 does not extend below the level of the outwardly extending flange 14, the tube surfaces to which the diaphragm is bonded thus being offset in the vertical, longitudinal direction when in an unloaded condition as shown in FIG. 2.

Although the diaphragm is of generally C shape in half cross-section it is not essential that its upper and lower surfaces each be of a C shape and as shown in FIG. 2 the upper surface 21 can be substantially part-spherical in shape.

The radially outer region 22 of the upper surface 21 is formed integrally with an enlarged longitudinally thickened buffer portion 23 for a purpose which will be described in more detail below.

To provide a suitable radial compliance characteristic a buffer bush 24 is mounted on the inner tube 11. The bush 24 comprises an inner metal support ring 25 and outer reinforcing ring 26. An annular element 27 of natural rubber is bonded to the rings. Radially outwards of the ring 26 is a thin natural rubber band 28 bonded to the ring 26 and formed integrally with a series of circumferentially spaced and radially outwardly extending fingers 29 which extend towards but are free from contact with the radially inner surface of the central portion 13 of the outer tube 12 in the absence of applied radial load.

The elastomeric mounting 10 is secured to vehicle body structure plates 30, 31 by means of a bolt extending through the inner tube 11 and to a vehicle cab structure 32 by means of bolts (not shown) which act on the outer tube flange 14.

An annular buffer ring 33 is attached to an upper surface of the lower body structure plate 31 to confront the frusto-conical flange 15 and thereby provide resistance to rebound movement of the mounting.

The general proportions of the rubber diaphragm are selected in relation to the normal cab load range such that the mounting exhibits a low vertical deflection stiffness characteristic over that range.

Higher vertical deflection of the inner tube downwards relative to the outer tube is resisted by the diaphragm and subsequently the effect of the bump buffer 23. Any rebound movement is resisted by the diaphragm and the effect of the buffer ring 33.

Figure 3:
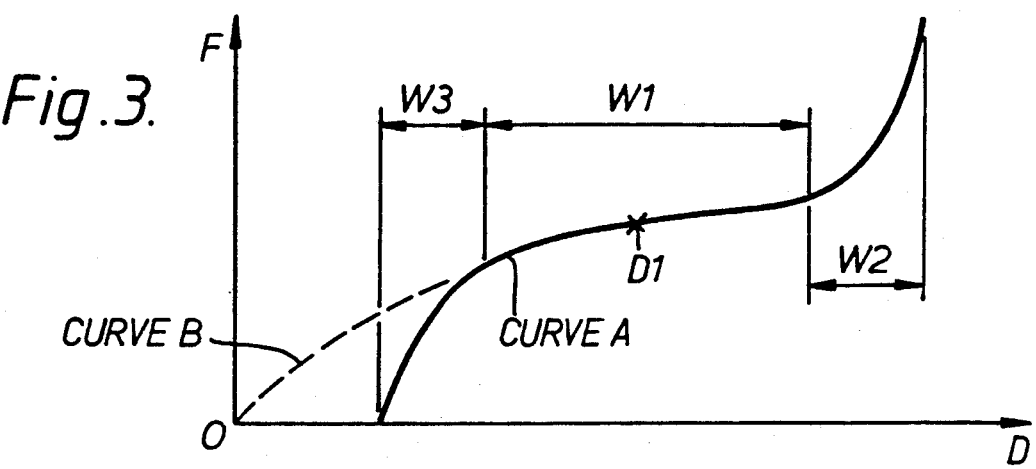
FIG. 3 shows the load-deflection characteristic of the elastomeric mounting of FIGS. 1 and 2, and FIGS. 4(a) to 4(c) show the longitudinal crosssectional shape and load-deflection characteristics of three alternative diaphragms for use in the mounting of FIG. 1.

Referring in more detail to FIG. 3, part W1 of curve A represents a first normal working range of relative longitudinal deflection of the inner and outer tubes. In the absence of applied dynamic load the relative deflection in the assembled condition in situ under static load preferably lies at position D1 which is mid-way between the deflection limits of the range W1. The annular diaphragm is selected in relation to the normal dynamic working load conditions such that usually the relative longitudinal deflection of the tubes will lie in the range W1 and thus the bump buffer 23 and rebound buffer 33 remain unstressed. In the event of excess applied load, the bump buffer will however be engaged and will result in a rapid increase of stiffness over a second working range W2 whilst, conversely, excess rebound load will result in the rebound buffer being engaged to give a rapid increase of stiffness over a third working range W3.

From FIG. 3 it will be seen that under conditions of zero applied load when the mounting is in situ there is a relative deflection of the tubes from their relative position when unstressed. This arises because of a pre-load applied to the annular diaphragm during assembly with the plates 30,31. In the absence of applied load this pre-load is balanced by compression of the rebound buffer 33. The dashed curve B shows the load deflection characteristic which would be exhibited by the mounting between zero relative deflection and commencement of the range W1 if the rebound buffer were not provided.

Figure 4A:
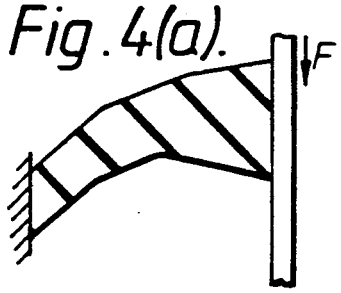
Figure 4A:
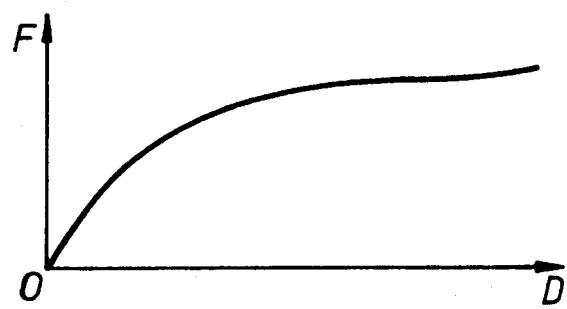
Figure 4B:
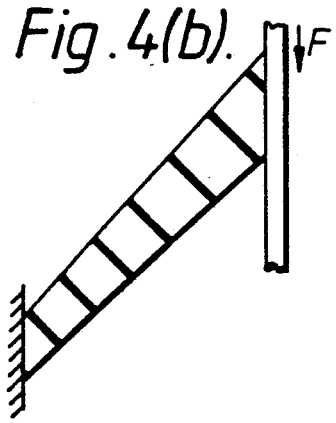
Figure 4B:
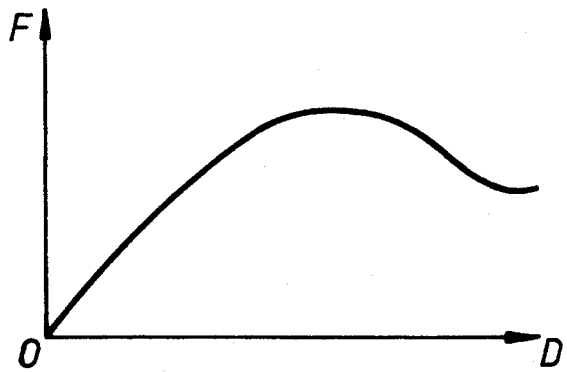
Figure 4C:
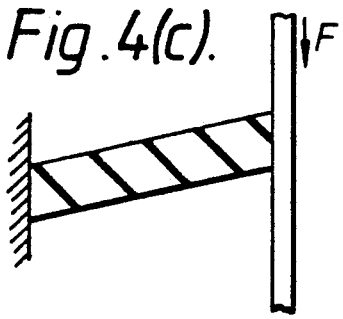
Figure 4C:
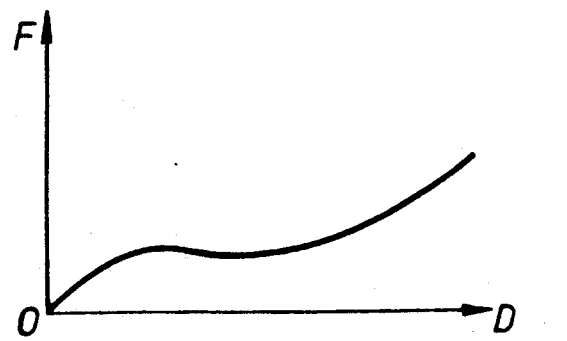

FIGS. 4(a) to 4(c) show longitudinal cross-sectional views of alternative diaphragm shapes, when in an unstressed condition, and their associated load-deflection characteristics. In general, for a more regressive load-deflection curve the bending deformation experienced by the diaphragm is more significant, and the degree of bending deformation is a function of the ratio of the thickness of the diaphragm in the longitudinal direction and the thickness in a transverse direction.

What I claim is:

1. An elastomeric mounting device for positioning between two plates fixed relatively to one another, said relatively fixed plates defining the maximum height of said mounting device, said device comprising:
   a pair of concentric rigid members arranged to define an annular space therebetween, one of said rigid member having means for securing it between said relatively fixed plates and the other rigid member having means for securing an article to be supported by said mounting, an annular element of elastomeric material which extends between and serves to interconnect said rigid members, the annular element being bonded to each of said rigid members at surface positions of the respective members which are longitudinally off-set when the elastomeric mounting is in an unstressed condition and one of said bonded surface portions being of a substantially cylindrical shape, the annular element of elastomeric material comprising between its inner and outer peripheries an annular section the thickness of which, as considered in said longitudinal direction, is less than the thickness of the element, in said direction, in at least one of the inner and outer peripheral regions and being of a shape which deforms by both shear and bending movements to exhibit a regressive stiffness characteristic in the event of relative longitudinal movement of the rigid members over a first working range of relative longitudinal positions of the rigid members, elastomeric axial buffer means operable at relative longitudinal positions of the rigid members which lie outside said first working range of relative longitudinal positions to provide outside of said first working range a resistance to relative longitudinal movement greater than that provided by the annular element of elastomeric material within said first working range of relative positions, said elastomeric axial buffer means comprising a pair of buffer elements, one arranged to restrict relative longitudinal movement in a second working range due to excess applied load and the other arranged to restrict relative longitudinal movement in a third working range due to excess rebound forces, one of said buffer elements being positioned to act between one of the relatively fixed plates and one of the rigid members and elastomeric transverse load bearing means secured relative to one only of said rigid members and arranged between said rigid members to resist relative movement of the rigid members in transverse directions perpendicular to the direction of said relative longitudinal movement, said transverse load bearing means comprising an annular body of elastomeric material secured to said one of said rigid members, said rigid members, said annular element and said buffer means being arranged so that no portion of said mounting device projects above or below said maximum height in any stage of operation of said mounting device.

2. An elastomeric mounting according to claim 1 wherein, as considered in a cross-sectional plane containing the longitudinal axis of the mounting, the minimum thickness of the annular element in the longitudinal direction is less than one half of the thickness of the element as considered in a direction transverse to the longitudinal axis.

3. An elastomeric mounting according to claim 2 wherein said minimum thickness in the longitudinal direction is no greater than one third of the thickness of the element in said transverse direction.

4. An elastomeric mounting according to claim 1 wherein one of said rigid members is formed with a frusto-conical shaped abutment flange arranged to confront said other of the pair of buffer elements and come into contact with said other buffer element at relative longitudinal positions of the rigid members lying in said third working range.

5. An elastomeric mounting according to claim 1 wherein said elastomeric buffer means is comprised of elastomeric material associated with said annular element of elastomeric material.

6. An elastomeric mounting according to claim 1 wherein the elastomeric transverse load bearing means comprises a peripherally spaced series of projections extending from said annular body to the other of said rigid members.

7. An elastomeric mounting according to claim 6 wherein said projections are free from contact with the other of said rigid members when the mounting is in an unloaded condition.

8. An elastomeric mounting according to claim 1 wherein said annular body of elastomeric material has a reinforcing ring embedded therein.

9. An elastomeric mounting device for positioning between two plates fixed relatively to one another, said relatively fixed plates defining the maximum height of said mounting device, said device comprising:

a pair of concentric rigid members arranged to define an annular space therebetween, one of said rigid member having means for securing it between said relatively fixed plates and the other rigid member having means for securing an article to be supported by said mounting, an annular element of elastomeric material which extends between and serves to interconnect said rigid members, the annular element being bonded to each of said rigid members at surface positions of the respective members which are longitudinally off-set when the elastomeric mounting is in an unstressed condition and one of said bonded surface portions being of a substantially cylindrical shape, the annular element of elastomeric material comprising between its inner and outer peripheries an annular section the thickness of which, as considered in said longitudinal direction, is less than the thickness of the element, in said direction, in at least one of the inner and outer peripheral regions and being of a shape which deforms by both shear and bending movements to exhibit a regressive stiffness characteristic in the event of relative longitudinal movement of the rigid members over a first working range of relative longitudinal positions of the rigid members, elastomeric axial buffer means operable at relative longitudinal positions of the rigid members which lie outside said first working range of relative longitudinal positions to provide outside of said first working range a resistance to relative longitudinal movement greater than that provided by the annular element of elastomeric material within said first working range of relative positions, said elastomeric axial buffer means comprising a pair of buffer elements, one arranged to restrict relative longitudinal movement in a second working range due to excess applied load and the other arranged to restrict relative longitudinal movement in a third working range due to excess rebound forces, one of said buffer elements being positioned to act between one of the relatively fixed plates and one of the rigid members and elastomeric transverse load bearing means secured relative to only an inner of said rigid members and arranged between said rigid members to resist relative movement of the rigid members in transverse directions perpendicular to the direction of said relative longitudinal movement, said rigid members, said annular element and said buffer means being arranged so that no portion of said mounting device projects above or below said maximum height in any stage of operation of said mounting device.

* * * * *